United States Patent [19]

Duval et al.

[11] Patent Number: 5,769,455
[45] Date of Patent: Jun. 23, 1998

[54] DEVICE FOR ACTIVE RETRACTION, IN THE EVENT OF IMPACT, OF AN AUTOMOBILE VEHICLE STEERING COLUMN

[75] Inventors: Benoit Duval; Frédéric Gentet, both of Vendome; Pascal Millet, Meslay, all of France

[73] Assignee: Lemforder NACAM SA, Vondome, France

[21] Appl. No.: 841,687

[22] Filed: Apr. 30, 1997

[30] Foreign Application Priority Data

May 3, 1996 [FR] France .................................. 96-05676

[51] Int. Cl.[6] ...................................................... B62D 1/19
[52] U.S. Cl. .............................. 280/777; 280/780; 74/492
[58] Field of Search .................................. 280/777, 780, 280/771, 779; 74/552, 554, 492, 493; 248/900

[56] References Cited

U.S. PATENT DOCUMENTS

| | | | |
|---|---|---|---|
| 3,424,263 | 1/1969 | Black ...................................... | 280/777 |
| 5,074,161 | 12/1991 | Hancock ................................... | 74/492 |
| 5,390,955 | 2/1995 | Kaliszewski et al. .................. | 280/777 |
| 5,425,553 | 6/1995 | Yazane et al. .......................... | 280/777 |
| 5,524,927 | 6/1996 | Toussaint ................................ | 280/777 |
| 5,673,938 | 10/1997 | Kaliszewski ............................ | 280/777 |

*Primary Examiner*—Christopher P. Ellis
*Attorney, Agent, or Firm*—Laubscher & Laubscher

[57] ABSTRACT

In an automobile vehicle steering column including a steering shaft mounted in a tube-body by means of bearings and attached to a reinforcing member of the tube-body which is mounted on a support member fixed to the chassis of the vehicle and an adjustment system with an axle for locking the support member, an active retraction device in the steering column comprises two sloping wedges mounted on and having conjugate inclinations relative to the axle, and at least one fusible pin coupling the sloping wedges. The inside sloping wedge is disposed around the depthwise adjustment slide and the outside sloping wedge is attached to the axle of the adjustment system. In the event of an impact, the fusible pin is sheared by the triggering of an air-bag and allows the sloping wedges to move apart and to release the tension in the adjustment system axle in order to allow the steering shaft to move in a required direction.

8 Claims, 3 Drawing Sheets

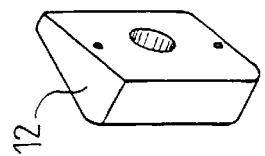
FIG.3
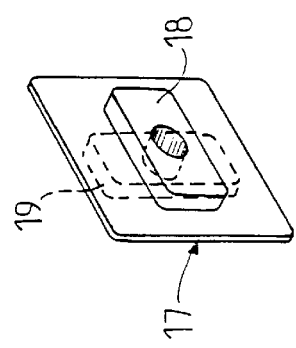
FIG.4 FIG.5 FIG.6
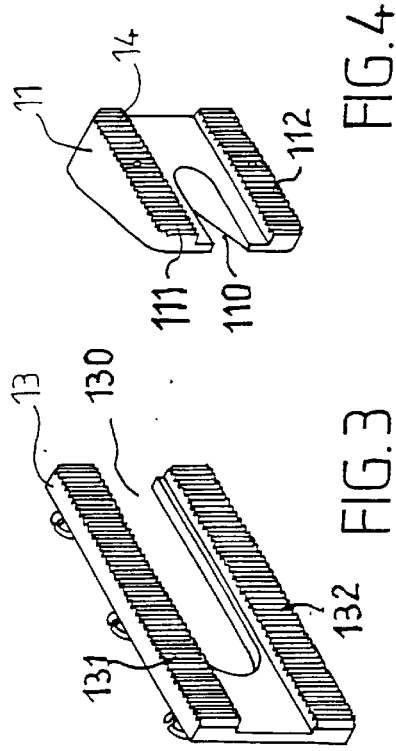
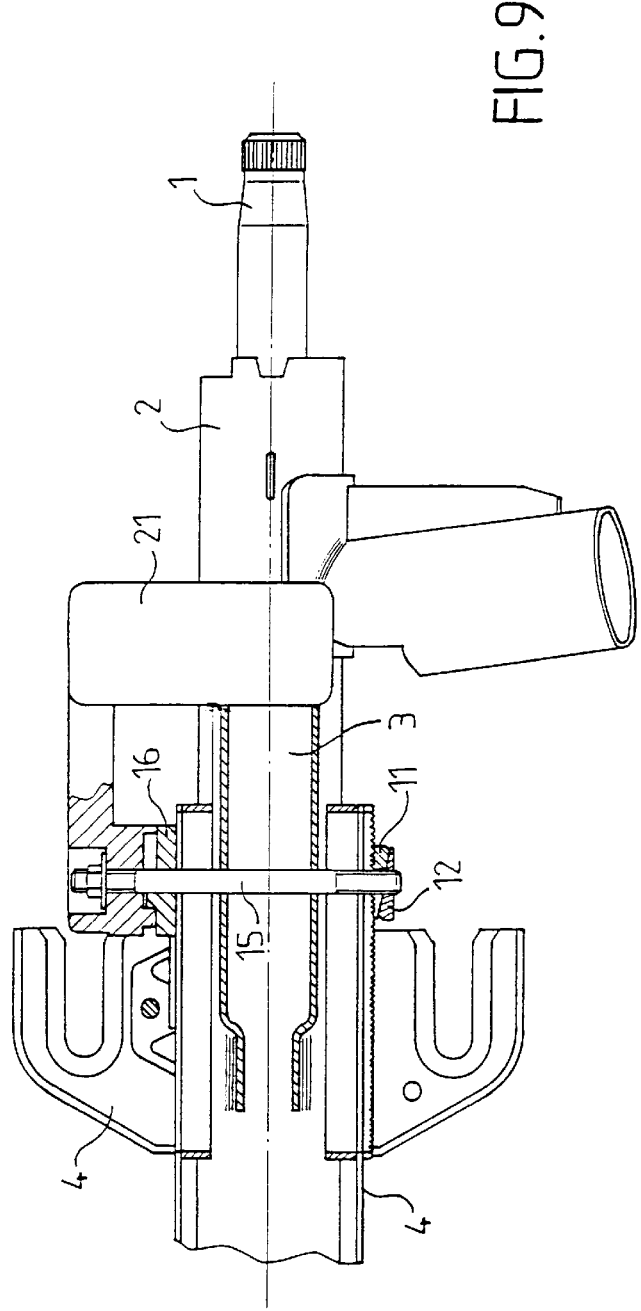
FIG.9

DEVICE FOR ACTIVE RETRACTION, IN THE EVENT OF IMPACT, OF AN AUTOMOBILE VEHICLE STEERING COLUMN

BACKGROUND OF THE INVENTION

1-Field of the Invention

The present invention relates to a device for active retraction, in the event of impact, of an automobile vehicle steering column.

2-Description of the Prior Art

The installation of an automobile steering column inside the passenger compartment must satisfy ergonomic criteria. Increasingly severe requirements for protection of the driver in the event of an accident, and in particular in the event of a head-on impact, have caused manufacturers to provide a safety air cushion system, usually known as an "air-bag", which inflates almost instantaneously upon impact to protect the driver by covering the steering wheel. For the system to operate optimally, it is necessary for the steering wheel to retract a certain distance to allow the air-bag to deploy correctly without injuring the driver of the vehicle.

OBJECT OF THE INVENTION

The main object of this invention is to propose a device for active retraction, in the event of impact, of an automobile vehicle steering column which operates so that the steering column is retracted a certain distance to allow the air-bag to operate under optimal conditions.

SUMMARY OF THE INVENTION

According to the invention, the device for active retraction, in the event of an impact, is in relation with an automobile vehicle steering column including a steering shaft mounted in a tube-body through bearing means. A reinforcing member attached to the tube-body is mounted on a support member fixed to the chassis of the vehicle. The reinforcing member is locked in a required position by an adjustment system. The device for active retraction according to the invention comprises inside and outside sloping wedges which are mounted on an axle of the adjustment system. The sloping wedges have conjugate inclinations relative to the axle of the adjustment system and are coupled by at least one fusible pin. The inside sloping wedge is disposed around the depthwise adjustment slide and the outside sloping wedge is attached to the axle of the adjustment system so that in the event of an impact the fusible pin is sheared by the triggering of an air-bag and allows the sloping wedges to move apart and to release the tension in the axle of the adjustment system in order to allow the steering shaft to move in a predetermined direction.

Advantageously, the active retraction device includes a rack system for maintaining a depthwise adjustment of said steering column. The rack system comprises a rack attached to the reinforcing member of the tube body. This rack is disposed around the depthwise adjustment slide and is adapted to cooperate with a rack attached to the inside sloping wedge.

In an embodiment particularly interesting of the invention, the rack of the reinforcing member includes a first open-ended depthwise adjustment slide and two rack portions surrounding this first slide. The inside wedge includes a second open-ended depthwise adjustment slide and two rack portions surrounding the second slide. Moreover, the first rack includes an abutment fixed to its end.

The active retraction device of the invention can also incorporate an anti-rotation system comprising a cross mounted on the axle of the adjustment system. This cross has on one face an inside tenon sliding in the depthwise adjustment slide and on the other face an outside tenon sliding in the heightwise adjustment slide.

According to the invention, the active retraction device has an architecture which is characterized in that the axle of the adjustment system is a screw passing through the reinforcing member. A cam for locking the adjustment system by means of a handle is disposed outside the support member. The rack of the reinforcing bracket, the rack attached to the inside sloping wedge and the outside sloping wedge attached to the screw are disposed outside the reinforcing member.

In another architecture of the active retraction device according to the invention, the axle of the adjustment system is a screw which is mounted in one wall of the reinforcing member. In this architecture locking a cam by means of an operating handle is effected externally of the support member. The cross is disposed between the support member and the reinforcing member. Internally of the reinforcing bracket are mounted the rack fixed to the reinforcing member, the rack attached to the inside sloping wedge, and the outside sloping wedge attached to the screw.

The device of the invention for active retraction of an automobile vehicle steering column in the event of an impact therefore has the advantage of allowing immediate retraction to enable the air-bag to deploy correctly without injuring the driver of the vehicle. Finally, the device of the invention can be adapted to suit and to be mounted very easily in new architectures or existing architectures of automobile vehicle steering columns.

BRIEF DESCRIPTION OF THE DRAWINGS

The foregoing and other objects, features and advantages of the invention will be apparent from the following detailed description of several embodiments of the invention with reference to the corresponding accompanying drawings in which:

FIG. 3 is a perspective view of a rack fixed to a reinforcing bracket in accordance with the invention;

FIG. 4 is a perspective view of a rack fixed to an inside sloping wedge;

FIG. 5 is a perspective view of a cross of the invention;

FIG. 6 is a perspective view of an outside sloping wedge;

FIG. 9 is a view of the device from FIGS. 7 and 8 taken along a plane perpendicular to those FIGS. and partially in section.

DESCRIPTION OF THE PREFERRED EMBODIMENTS

Figure 1:
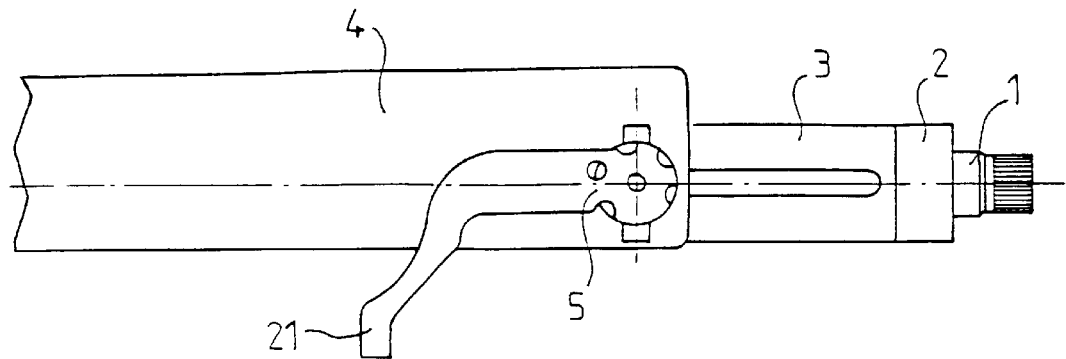
FIG. 1 is an axial view of the device of the invention for active retraction of an automobile vehicle steering column in the event of an impact.

As can be seen in the various figures showing the active retraction device of the invention as a whole, an automobile vehicle steering column includes a steering shaft 1 which is freely rotatable in a tube-body 2. The tube-body 2 is disposed in a support member 4 which is attached to the chassis of the automobile vehicle. The steering shaft 1 is mounted in the tube-body 2 by means of two bearings 9. The tube-body 2 is adjustable in height and in depth in the vertical plane and is locked in the support member 4 by a system 5 for adjusting the position of said steering column.

As can be seen in FIGS. 1 through 6, the device of the invention for active retraction of an automobile vehicle steering column in the event of an impact comprises an inside sloping wedge 11 and an outside sloping wedge 12 which are mounted on the axle of the adjustment system. The inside sloping wedge 11 and the outside sloping wedge 12 have conjugate inclinations relative to the adjustment pin 5. The inside sloping wedge 11 and the outside sloping wedge 12 are joined together by two fusible pins 10. The inside sloping wedge 11 is disposed around a depthwise adjustment slide 6 in a reinforcing square, and the outside sloping wedge 12 is attached to the adjustment axle 5.

In the event of an impact, the fusible pins 10 shear which enables the inside and outside sloping wedges 11 11 and 12 to move apart and to remove the tension from the axle of the adjustment system 5 thereby allowing the steering shaft to move in the direction required for optimal functioning of the air-bag.

The active retraction device shown in FIGS. 1 through 6 is characterized in that the axle of the adjustment system 5 is a screw 15 mounted on one wall of the reinforcing square 3 attached to the tube-body 2. In this embodiment, the active retraction device further includes a rack system for maintaining the depthwise adjustment, and a cross 17 to prevent rotation of the steering wheel.

The rack system comprises a rack 13 attached to the reinforcing square 3 and cooperating with a rack 14 integral with the inside sloping wedge 11. As can be seen in FIG. 3, the rack 13 on the reinforcing square 3 includes two parallel rack portions 131 and 132 and an open-ended depthwise adjustment slide 130 therebetween. As can be seen in FIG. 4, the inside sloping wedge 11 includes two parallel rack portions 111 and 112 and an open-ended depthwise adjustment slide 110 therebetween.

The rack portions 131 and 132 cooperate with the rack portions 111 and 112 respectively. Moreover, the rack 13 of the reinforcing square 3 includes an abutment 20 fixed to its end. The rack 13 is fixed to the inside of the corresponding wall of the reinforcing bracket 3. The rack 13 is disposed around the depthwise adjustment slide 6 and cooperates with the rack 14 attached to the inside sloping wedge 11, the open-ended depthwise adjustment slide 110 of which provides a passage for the screw 15.

As can be seen in FIG. 5, the cross 17 for preventing rotation of the steering wheel has an inside tenon 18 on one face and an outside tenon 19 on the other face. The cross 17 is mounted on the screw 15 and is disposed between the support member 4 and the corresponding wall of the reinforcing square 3, so that the inside tenon 18 slides in a depthwise adjustment slide 6 of the steering column and the outside tenon 19 slides in the heightwise adjustment axle 7 of the steering column.

FIGS. 4 and 6 are perspective views showing in detail the construction of the inside and outside sloping wedges 11 and 12. In FIG. 4, the inside sloping wedge 11 has two holes adapted to receive the fusible pins 10. In FIG. 6, the outside sloping wedge 12 has also two holes adapted to receive the fusible pins 10 and a hole through which the screw 15 passes.

Figure 2:
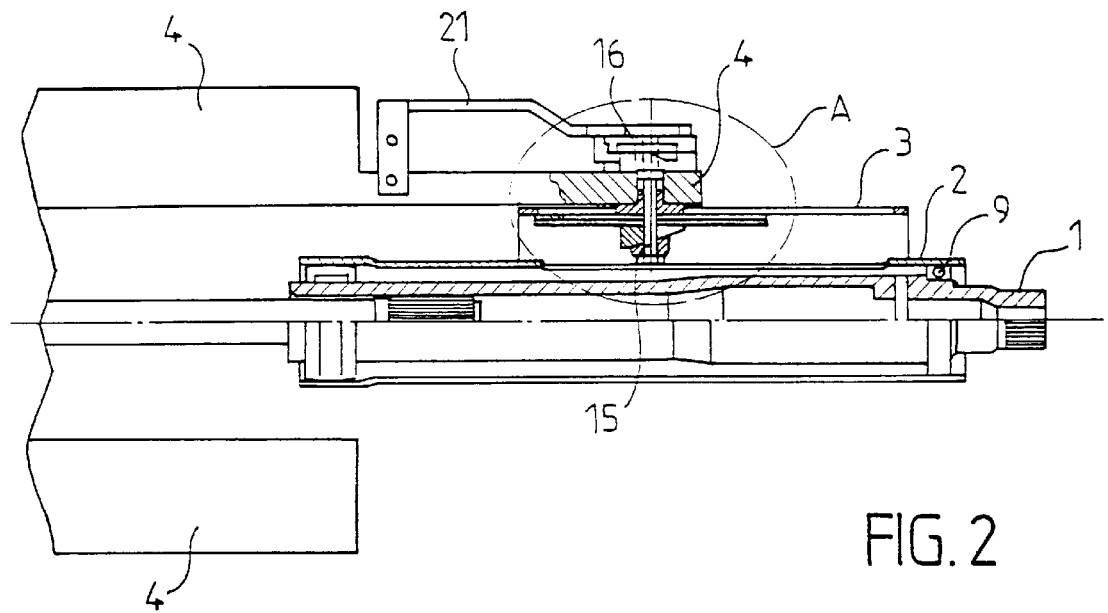
FIG. 2 is a view taken along a plane perpendicular to that of FIG. 1, partly in axial section.
Figure 2A:
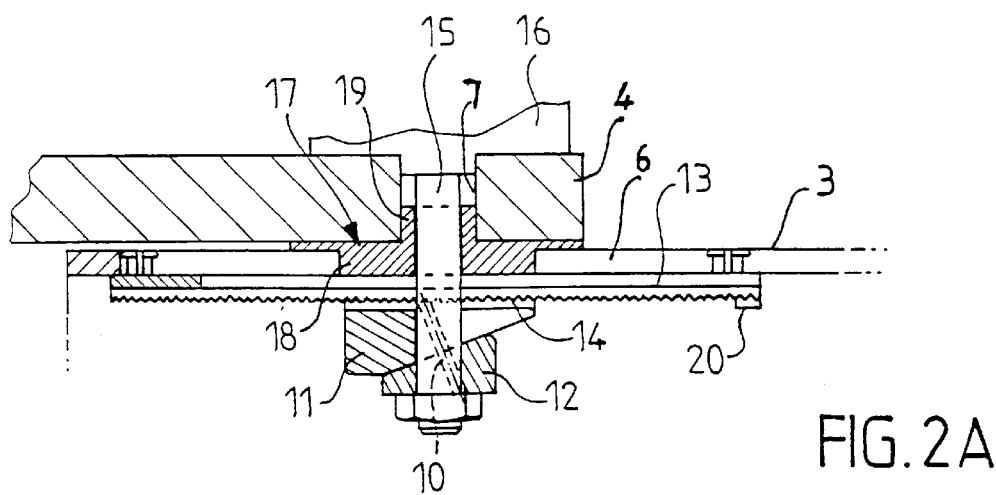
FIG. 2A is a fragmentary view of FIG. 2.

The active retraction device of the invention shown in FIGS. 1, 2 and 2A is therefore characterized in that the axle of the adjustment system 5 is the screw 15, which is mounted on one wall of the reinforcing square 3. Externally of the support member 4, the adjustment system 5 is locked up by a cam 16 by means of the operating handle 21. The cross 17 is mounted on the screw 15 and disposed between the support member 4 and the corresponding wall of the reinforcing square 3. Finally, inside the wall of the reinforcing square 3, the rack 13 is fixed to the reinforcing square 3 and cooperates with the rack 14 attached to the inside sloping wedge 11. The inside sloping wedge 11 cooperates with the outside sloping wedge 12 which is attached to the screw 15.

In the embodiment of the active retraction device of the invention shown in FIG. 9 the axle of the adjustment system 5 is a screw 15 which entirely passes through the reinforcing square 3 of the tube-body 2. Externally of the support member 4, locking is effected by the cam 16 by means of the operating handle 21. Additionally, the rack 13 is fixed to the outside of said reinforcing square 3, on the corresponding wall thereof, and cooperates with the rack 14 integral with the inside sloping wedge 11. The inside sloping wedge 11 cooperates with the outside sloping wedge 12 which is attached to the screw 15.

The fusible pins 10 are sized to resist correctly in a normal situation and to shear if the air-bag is triggered. Under normal circumstances the force on the steering wheel is transmitted to the fusible pins 10 via the steering shaft 1, the top bearing 9, the tube-body 2 and the reinforcing square 3 with the rack 13. The rack 13 transmits the force to the rack 14 integral with the inside sloping wedge 11 by means of the fusible pins 10 so that the force is transmitted to the outside sloping wedge 12. From here the force is transmitted to the screw 15, to the cam 16 and finally to the support member 4 which is part of the chassis of the vehicle. There is therefore no retraction of the steering column.

If the impact of the air-bag is greater than the predetermined force, the fusible pins 10 break which causes the outside sloping wedge 12 to slide relative to the inside sloping wedge 11 and thus releases the tension in the screw 15, releases the steering column and enables retraction of the steering wheel.

Figure 7:
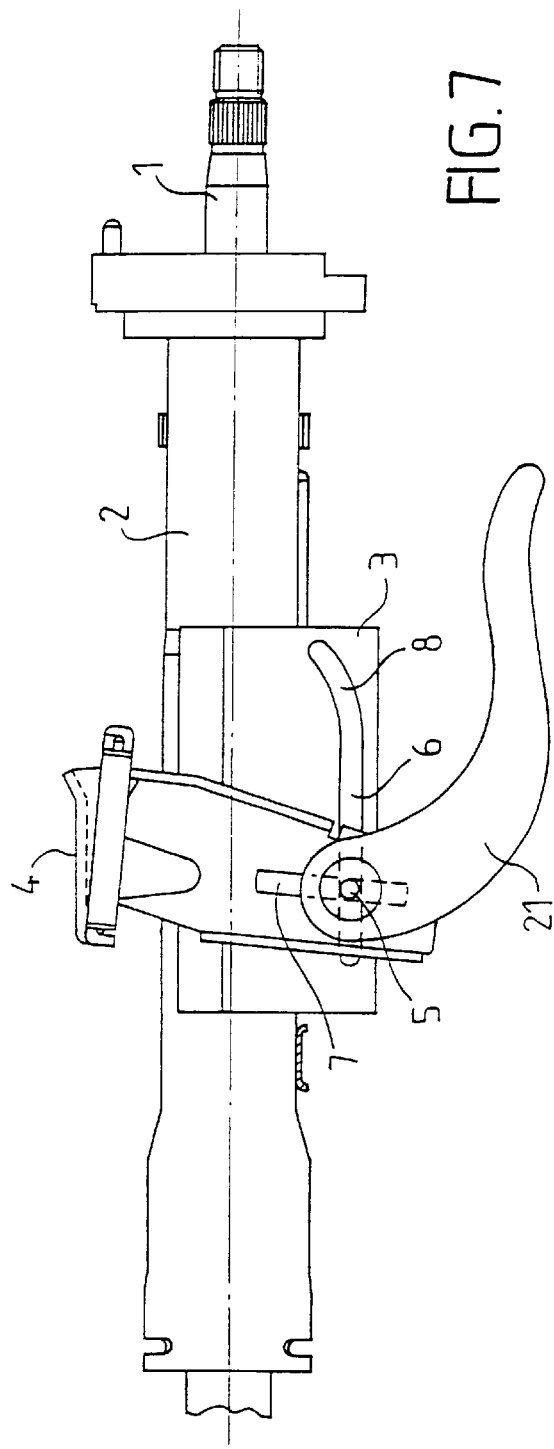
FIG. 7 is an axial view of a steering column of the invention in normal use, no impact.
Figure 8:
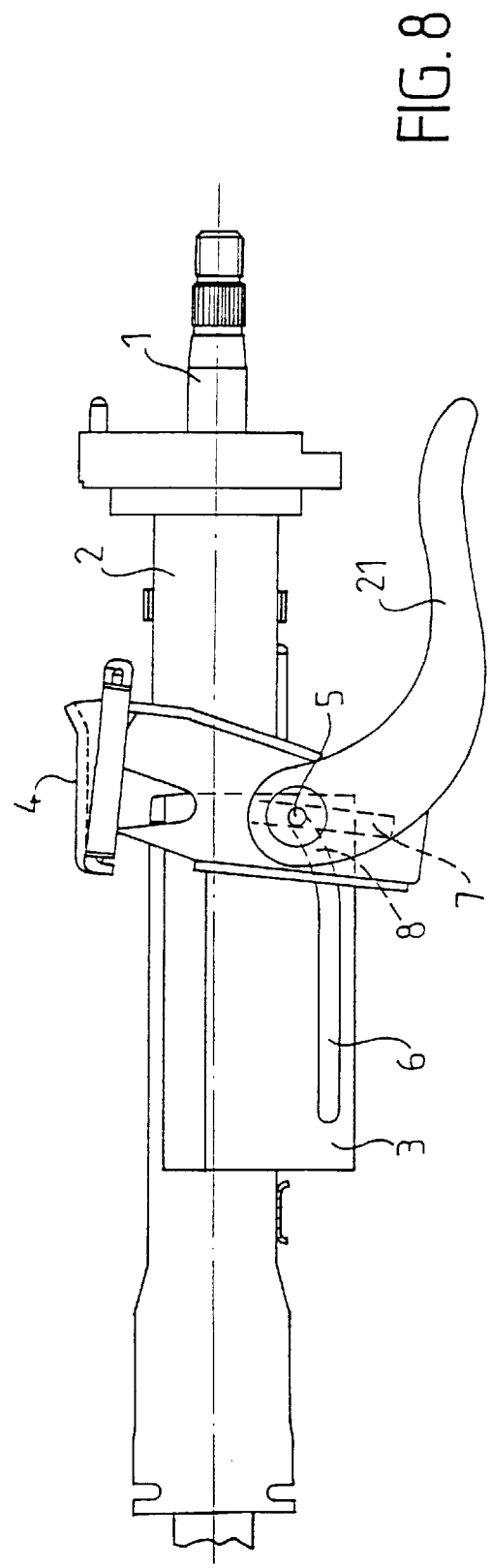
FIG. 8 is a view analogous to FIG. 7 after an impact and retraction of the steering column.

FIG. 7 shows a steering column assembly when the force on the steering wheel is within normal limits, while FIG. 8 shows the steering column system of the invention after the retraction occurring in the event of an impact.

When the fusible pins 10 have sheared, the column is entirely free to move in the direction of the depthwise adjustment, as shown in FIG. 8, in particular if the vehicle decelerates suddenly upon impact. Moreover, the function of the depthwise adjustment abutment is effected either according to the position of the operating handle 21 or on the portion of the rack 13 that includes an abutment 20.

What we claim is:

1. A device for active retraction of an automobile vehicle steering column in the event of an impact, said steering column comprising
an adjustment system for positioning said steering column,
a support member fixed to a chassis of said vehicle and locked in a required position by said adjustment system,
a steering shaft mounted in a tube-body through bearing means, and
a reinforcing member attached to said tube-body and mounted in said support member, said active retraction device comprising inside sloping wedge and outside sloping wedge mounted on an axle of said adjustment system and at least one fusible pin coupling said inside sloping wedge and outside sloping wedge, said inside sloping wedge and outside sloping wedge having conjugate inclinations relative to said axle of said adjustment system, said inside sloping wedge being disposed around a depthwise adjustment slide in said reinforcing square and said outside sloping wedge being attached to said axle of said adjustment system so that in the event of an impact said fusible pin is sheared by the triggering of an air-bag and allows said inside sloping wedge and outside sloping wedge to move apart and to release a tension in said axle of said adjustment system in order to allow said steering shaft to move in a predetermined direction.

2. An active retraction device as claimed in claim 1 including a rack system for maintaining a depthwise adjustment of said steering column.

3. An active retraction device claimed in claim 1 comprising a first rack attached to said reinforcing member and disposed around said depthwise adjustment slide, and a second rack cooperating with said first rack and attached to said inside sloping wedge.

4. The active retraction device claimed in claim 3 wherein said first rack includes a first open-ended depthwise adjustment slide and two rack portions surrounding said first slide, and said inside sloping wedge includes a second open-ended depthwise adjustment slide and two rack portions surrounding said second slide.

5. An active retraction device as claimed in claim 1 including a cross mounted on said axle of said adjustment system, said cross having on one face an inside tenon sliding in said depthwise adjustment slide and on another face an outside tenon sliding in a heightwise adjustment slide of said steering column.

6. The active retraction device claimed in claim 4 wherein an abutment is fixed to an end of said first rack.

7. The active retraction device claimed in claim 4 wherein said axle of said adjustment system is a screw passing through said reinforcing member; a cam for locking said adjustment system by means of a handle is disposed outside said support member; and said first rack, said rack attached to said inside sloping wedge and said outside sloping wedge attached to said screw are disposed outside said reinforcing member.

8. The active retraction device claimed in claim 5 wherein said axle of said adjustment system is a screw mounted in a wall of said reinforcing member; a cam for blocking said adjustment system by means of a handle is disposed outside said support member; said cross is disposed between said support member and said reinforcing member; and a first rack attached to said reinforcing member, said inside sloping wedge having a second rack cooperating with said first rack, and said outside sloping wedge attached to said screw are disposed inside said reinforcing member.

* * * * *